March 17, 1959  P. SCHLUMBOHM  2,877,865
METHOD OF PUMPING FLUIDS CENTRIFUGALLY
Filed May 13, 1953
Fig. 2.
Fig. 1.
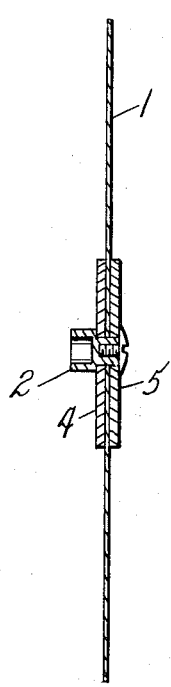
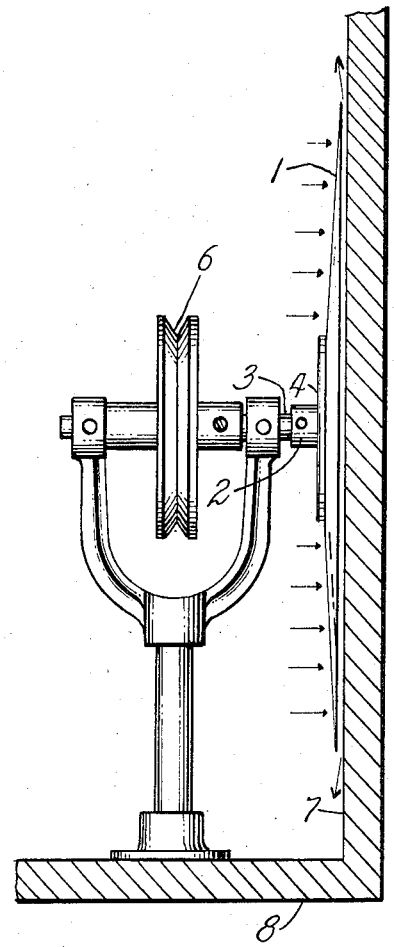
INVENTOR.

United States Patent Office 2,877,865
Patented Mar. 17, 1959

2,877,865

METHOD OF PUMPING FLUIDS CENTRIFUGALLY

Peter Schlumbohm, New York, N. Y.

Application May 13, 1953, Serial No. 354,786

2 Claims. (Cl. 183—63)

The present invention refers to a method of and apparatus for pumping fluids, especially of pumping air. The invention is a continuation in part of my invention described in my co-pending patent application of May 10, 1951, Serial #225,620, for a Ventilator; and of my co-pending patent application Serial #298,109, filed July 10, 1952, for a Method of Producing Centrifugally a Laminated Flow of Fluids.

The invention disclosed in the parent application—of which Ser. #225,620 has resulted in U. S. Patent #2,706,016; and of which Ser. #298,109 was abandoned in favor of copending patent applications, of which this application was one—is based on a new effect which can be obtained by a friction pump of my invention for centrifuging fluids, comprising a rotatable shaft, a plurality of concentrically superposed porous discs so attached to said shaft that the pores of said discs form the only intake passage for the fluid to be pumped; the space between two directly adjacent superposed porous discs forming the centrifuging space in which the fluid is centrifuged towards the peripheral zone of said centrifuging space.

The porosity of the material of the discs is such that the pores offer enough flow resistance to throttle the flow of a gas passing through them, whereby a continuous partial vacuum is maintained in the centrifuging space when the gas is centrifuged towards the peripheral zone of that space.

In my application Ser. #298,109, I had discovered the reason for the effect: I found that such a porous disc with its uninterrupted surface will suck off the boundary layer through the pores of its surface in a one-way flow and will eject this air in a laminary flow at the periphery of the disc, where a 360° nozzle is formed between the edges of two adjacent discs.

Viewing the apparatus of Patent #2,706,016 with the aspect of this conception of a method, led to various experiments in which the apparatus was modified. The most important modification resulting from these experiments is the subject of the present application. I found that the effect could be obtained already with one single porous disc of uninterrupted surface rotating in front of a non-rotating wall which, by its proximity to the rotating disc, becomes a co-pumping wall so that the space between the rotating disc and the non-rotating wall is the centrifuging space in which the fluid, sucked through the pores of the rotating disc, is centrifuged towards the peripheral zone of this centrifuging space.

This part of the invention is illustrated in Figure 1 of the accompanying drawings. The air flow is indicated by arrows. The wall is shown in section, and the remainder of the apparatus is shown in view.

Figure 1 shows a spinning porous disc and the non-rotating copumping wall, shown partly in section and partly in view.

Figure 2 shows, in vertical section, the disc.

Figure 1 shows the disc 1 mounted in an arbor 2. The arbor is mounted on the spinning shaft 3 which is driven by a pulley 6. The disc 1 spins parallel to a wall 7 which may be the wall of a house 8.

Figure 2 shows the detail of mounting the disc 1 between two washers 4, 5 of the arbor 2. The disc 1 is a sheet of very porous material.

Figure 1 illustrates by arrows the effect of the rotating disc. A partial vacuum is produced between the disc 1 and the wall 7, when the air of that space is thrown out centrifugally. Fresh air enters as shown through the entire surface of the porous disc to fill that vacuum. The disc deforms to the shape of a frustum of a cone when rotated, due to the partial vacuum, so as to form a restricted peripheral outlet. The space underneath the disc comprises a center zone around the axis of rotation and a peripheral ejection zone. The disc comprises an entry zone which extends over the center zone to the peripheral zone. The peripheral zone forms a restricted outlet. The entering fluid flows axially through the pores of the disc in what may be termed one-way, axial porous flow and then flows outwardly through the restricted peripheral ejection zone in what may be termed a one-way valved flow.

The possibility of operating with a non-rotating co-pumping wall, and pumping fluid over the surface of this wall, leads to the modification of having this non-rotating wall cooled by cooling means or heated by heating means, and to use the fluid which is sucked through the pores of the rotating disc as a heat exchanging fluid which either gives off heat to a cooled wall or takes up heat from a heated wall. In a different modification, one could heat or cool the fluid prior to its being sucked through the pores into the space contacted by the non-rotating wall, and one could by these means heat or cool the non-rotating wall. If one visualizes, for instance, a disc 1 of large diameter rotating in the described manner in proximity of the wall of a house, this wall could be very efficiently cooled or heated by cool air or, respectively, hot air being pumped in this manner over that wall.

For instance, a house could have a plane roof and the disc could have the diameter of that roof. When not in motion, the disc lies on the roof like a carpet. The moment the disc rotates it will be riding on the cushion of air which it pumps. Such a roof would be well cooled and its temperature would not rise considerably beyond the temperature of the air over it.

As shown in the Fig. 1, it is sufficient that the diameter of the disc is only a fraction of the length and width of the wall. The laminary flow characteristic of the fluid which leaves the 360° nozzle formed by the periphery of the disc and the wall brings the ejected fluid in contact with the adjacent parts of the wall to further heat or cool that wall.

The single porous disc of an uninterrupted surface as shown in Fig. 2 is novel as impeller element. Never before has one single rotating disc produced this effect. The disc may be stiff, as shown in Fig. 2 or from a bendable material, which then deforms into the conical shape as shown in Fig. 1. If the disc is used to pump a hot fluid, the disc must be of temperature-resistant material.

I claim as my invention:

1. The method of pumping gases centrifugally from a space starting pressure to a space of higher pressure by letting the gas flow through an entry zone into a centrifuging space, having a center zone around the axis of rotation and a peripheral ejection zone, characterized by extending the entry zone to the peripheral zone and maintaining throughout the centrifuging space a pressure smaller than the starting pressure by the co-operating measures of (a) restricting the flow of the entering fluid to a one-way, axial, porous flow and (b)

restricting the flow of the ejected gas in the ejection zone to a one-way, valved flow.

2. Friction pump for pumping gases centrifugally from a space of starting pressure to a zone of higher pressure by letting the gas flow through an entry zone into a walled centrifuging space, having a center zone and a peripheral ejection zone, in which a pressure smaller than the starting pressure is created by centrifuging the gas towards the peripheral ejection zone, comprising a stationary, plane, impervious wall forming part of the walls of the centrifuging space, a rotatable shaft arranged in front of the wall at an angle of 90°; a single disc of porous, flexible material, having an inner and an outer surface, forming the remainder of the walls of the centrifuging space, facing with its inner surface the impervious, stationary wall and facing with its outer surface the space of the gas of starting pressure and being so attached to the shaft that its pores form the only passage for the gas entering the centrifuging space; said pores offering a predetermined flow resistance to maintain all over the inner surface of the disc a sufficient underpressure to let the pressure on the outer surface of the disc deflect the flexible porous disc in a conical configuration towards the stationary wall to produce in the peripheral zone an ejection slot just wide enough for a one-way flow of the ejected gas, whereby, in cooperation with said flow resistance of the pores, the maintence of the underpressure in the centrifuging space is secured.

References Cited in the file of this patent

UNITED STATES PATENTS

| | | |
|---|---|---|
| 2,272,746 | Hansen | Feb. 10, 1942 |
| 2,321,907 | Gent | June 15, 1943 |
| 2,571,173 | Vaughan | Oct. 16, 1951 |
| 2,632,598 | Wales | Mar. 24, 1953 |
| 2,655,310 | Schlumbohn | Oct. 13, 1953 |
| 2,706,016 | Schlumbohn | Apr. 12, 1955 |